United States Patent [19]
Olson

[11] Patent Number: 5,411,124
[45] Date of Patent: May 2, 1995

[54] METHOD AND APPARATUS FOR DETERMINING CLUTCH TOUCH POINT

[75] Inventor: Otis J. Olson, Farmington Hills, Mich.

[73] Assignee: Eaton Corporation, Cleveland, Ohio

[21] Appl. No.: 112,568

[22] Filed: Aug. 26, 1993

[51] Int. Cl.⁶ ............................................. B60K 41/02
[52] U.S. Cl. .................................. 192/103 R; 477/86; 477/175; 477/180
[58] Field of Search ............... 192/103 R; 74/86, 175, 74/180

[56] References Cited

U.S. PATENT DOCUMENTS

| | | | |
|---|---|---|---|
| 4,620,624 | 11/1986 | Mitsui et al. | 477/175 X |
| 4,653,621 | 3/1987 | Oshiage | 477/175 |
| 4,678,069 | 7/1987 | Yoshimura et al. | |
| 4,765,450 | 8/1988 | Kurihara et al. | 477/86 |
| 4,825,993 | 5/1989 | Kurihara et al. | 477/78 |
| 4,899,858 | 2/1990 | Coté et al. | 477/83 |
| 4,971,183 | 11/1990 | Tellert | 192/103 R X |
| 5,029,678 | 7/1991 | Koshizawa | |
| 5,050,714 | 9/1991 | Kurihara et al. | 192/103 R X |
| 5,065,849 | 11/1991 | Kono et al. | 364/424.1 X |
| 5,065,851 | 11/1991 | Otsuka et al. | 192/103 R |
| 5,069,319 | 12/1991 | Makabe | 192/103 R X |
| 5,176,234 | 1/1993 | Reik et al. | |
| 5,275,267 | 1/1994 | Slicker | 192/103 R X |
| 5,332,074 | 7/1994 | Braun | 192/3.63 |

Primary Examiner—Andrea L. Pitts
Attorney, Agent, or Firm—Brooks & Kushman

[57] ABSTRACT

A vehicle clutch engagement position is disclosed wherein the clutch is moved, under computer control, at a constant rate, from a disengaged position toward a fully engaged position while the transmission is in neutral gear, and the position of the clutch is detected at first and second times (T1 and T2). Time T1 corresponds to the time when the detected speed of the transmission input shaft is just above the dropout speed of the input shaft speed sensor. Time T2 corresponds to the time when the detected speed of the input shaft is close to engine speed. The position of the clutch corresponding to the incipient torque point is extrapolated by subtracting an offset amount from the position detected at time T1. The offset is equal to the change in position from T1 to T2 multiplied by the square root of the ratio of the input shaft speeds at T1 and T2.

7 Claims, 2 Drawing Sheets

METHOD AND APPARATUS FOR DETERMINING CLUTCH TOUCH POINT

TECHNICAL FIELD

This invention relates generally to automatic clutch control systems for controlling the coupling of a motor vehicle engine with the vehicle transmission and more particularly to a method and apparatus for determining the incipient torque position of the clutch.

BACKGROUND ART

A typical motor vehicle clutch control system moves the clutch from a disengaged position to an incipient torque position or touch point at a relatively fast rate. If the clutch actuator overshoots this initial torque position at the fast rate, the resulting buildup of clutch torque may be excessive and cause the vehicle to lurch or bounce, such that a smooth start is not achieved. It is therefore important to accurately identify the touch point.

It has been proposed to optimize the positioning of a motor vehicle clutch at the incipient torque position utilizing a variety of sensed parameters including engine speed and transmission input speed. See for example U.S. Ser. No. 817,161 filed Jan. 6, 1992, now U.S. Pat. No. 5,332,074, assigned to the assignee of the present invention, as well as U.S Pat. Nos. 5,176,234; 5,029,678; and 4,678,069 all of which are incorporated herein by reference.

In systems where speed sensors such as those of the variable reluctance type are used, the sensor output signal drops to zero at some finite "dropout" speed greater than zero, for example 180 rpm for a typical sensor. When attempting to locate the incipient torque position of the clutch, equivalent to sensing the first rotation of the transmission input shaft, some method of compensating for lack of information from the speed sensor at the touch point must be employed or error will be introduced.

SUMMARY OF THE INVENTION

In view of the above it is an object of the present invention to provide an improved method and apparatus for determining clutch touch point which assures a low torque during initial clutch engagement to insure smooth starts of the vehicle.

It is an object of the present invention to provide an improved method and apparatus for determining clutch touch point which calculates the touch point directly without resort to an arbitrary position offset.

It is another object of the present invention to provide a method and apparatus for determining clutch touch point using data obtained from sensing transmission input shaft speed and clutch position at two discrete times during clutch engagement.

In accordance with the present invention the clutch is moved, under computer control, at a constant rate, from a disengaged position toward a fully engaged position while the transmission is in neutral gear, and the position of the clutch is detected at first and second times (T1 and T2). Time T1 corresponds to the time when the detected speed of the transmission input shaft is just above the dropout speed of the input shaft speed sensor used, for example 180 RPM. Time T2 corresponds to the time when the detected speed of the input shaft is close to engine speed, for example 75% of engine speed. The position of the clutch corresponding to the incipient torque point or engagement point, where the input shaft begins to move, is extrapolated by subtracting an amount from the position detected at time T1 equal to the change in position from T1 to T2 multiplied by the square root of the ratio of the input shaft speeds at T1 and T2. The rationale for this method of determining the clutch touch point is based on the assumption that over the time interval of T1 to T2 a linear relationship exists between clutch torque and clutch position and therefore clutch torque and consequently angular acceleration is proportional to time and angular velocity of the input shaft speed is a function of time squared. Thus, the present invention provides an indication of the touch position equivalent to sensing the first rotation of the input shaft as if a zero speed sensor was being employed.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
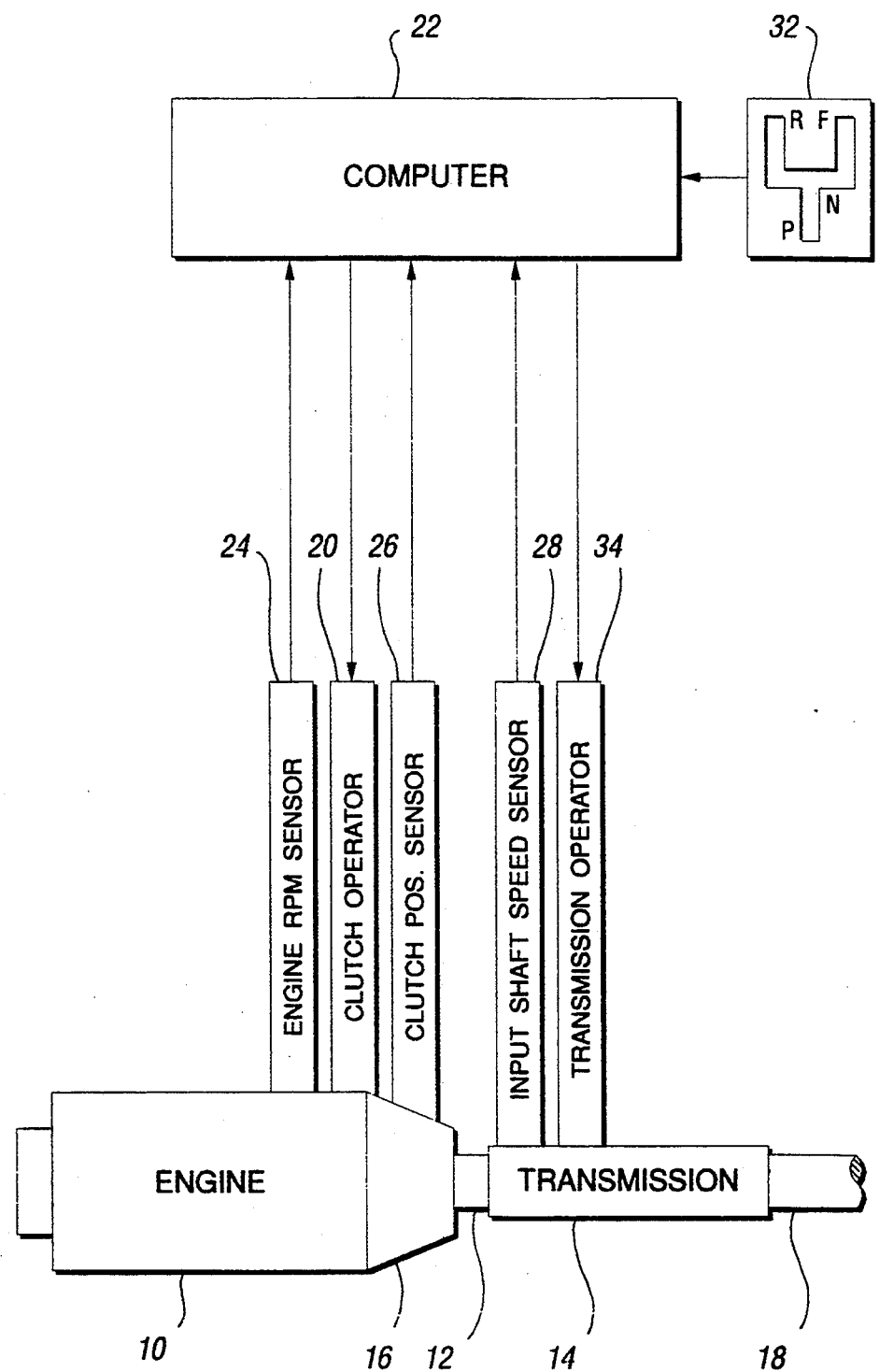
FIG. 1 is a block diagram of the apparatus of the present invention.

Referring now to the drawings and initially to FIG. 1, the engine 10 is selectively coupled to the input shaft 12 of a transmission 14 by a friction clutch mechanism 16. The transmission 14, when coupled to the engine 10 drives an output shaft 18 at a speed which is reduced relative to the speed of the input shaft 12 by the gear ratio selected. The shaft 18 may for example be connected to a vehicle's drive wheels by a differential mechanism or the like.

The mechanism 16 includes the usual friction clutch which can be moved from a fully disengaged position to a fully engaged position by an operating mechanism 20 that is controlled by a programmable computer 22. The computer 22 receives input data from an engine RPM sensor 24, a clutch position sensor 26, and a transmission input shaft sensor 28. The computer 22 also receives a transmission gear ratio command from a gear selector 32 and provides a control signal to a transmission operator 34 to effect the desired gear selection. The clutch position may be monitored by connecting the sensor 26 to the clutch linkage to indicate position of the clutch release bearing. The clutch operator 20 may include an actuator that positions the clutch linkage in response to commands from the computer 22. The release bearing is preferably moved at a substantially constant rate by pulse width commands that produce a constant step size or clutch movement increment each fixed time interval.

The determination of the clutch touch point is preferably made each time the vehicle is started, while the transmission is in neutral gear and is stored in the memory of computer 22 replacing the previously determined position value. The method of determining clutch touch point with be discussed in some detail in connection with the flow chart of FIG. 2. Data is gathered by the computer 22 at two discrete times, T1 and T2. T1 represents the time at which the speed of the transmission input shaft 12 is just above the dropout speed of the sensor 28. Time T2 represents the time at which the speed of the transmission input shaft 12 is approaching synchronism with engine speed for example where the output of sensor 28 is approximately 75% of the output of sensor 24. Since the clutch release bearing is being moved at a constant rate, a linear relationship may be assumed between clutch torque and clutch position during the short portion of the clutch stroke traversed between the times T1 and T2. This linear relationship may be expressed by the equation:

$$T = k*t$$

where T = torque
t = time
and k is a constant
Angular acceleration is given by the expression:

$$T = J*\alpha$$

where J = moment of inertia about the axis of rotation, and $\alpha$ = angular acceleration.
Substituting for T in the above equation:

$$J*\alpha = k*t$$

Defining a new constant K = k/J. Then:

$$\alpha = K*t$$

Since angular velocity equals acceleration multiplied by time, we may write:

$$\omega = \alpha*t$$

where $\omega$ = angular velocity
Substituting for $\alpha$:

$$\omega = K*t^2$$

Using the speeds at T1 and T2, the time increment elapsed since the shaft speed was at zero speed is calculated based on the fact that shaft speed is zero at time zero (T0) and shaft speed increases as a function of time squared. Using the positions at T1 and T2, the position corresponding to zero shaft speed is calculated using the linear relationship between position and time.

Figure 2:
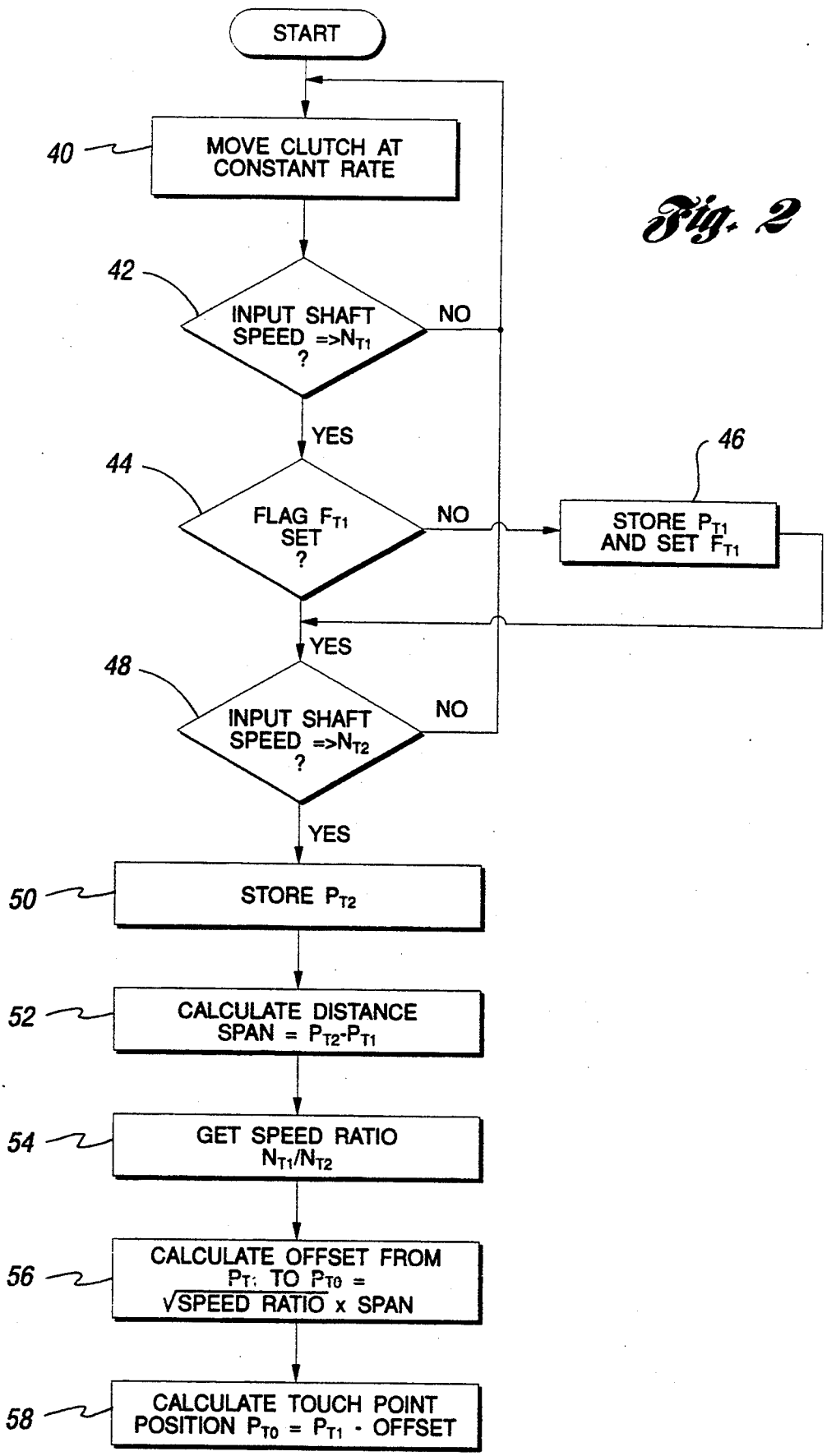
FIG. 2 is a flow chart of the computer program implementing the method of the present invention.

With reference to the flow chart of FIG. 2, the touch point determination routine is entered each time the vehicle is started if the transmission is in neutral and the clutch is fully disengaged. Under these conditions the computer begins advancing the clutch toward an engaged position, a fixed amount each predetermined time interval so that the clutch is moved at a constant rate as indicated by the block 40. When the sensed transmission input shaft speed is equal to or greater than a predetermined speed $N_{T1}$, just above dropout speed of the sensor, as determined by the decision block 42, a flag $F_{T1}$ is checked at decision block 44. If the flag is CLEAR, the position of the clutch, $P_{T1}$, is stored, the flag is SET at block 46. In decision block 48 the input shaft speed is compared with a predetermined speed $N_{T2}$ following the operation in block 46 or if the flag $F_{T1}$ is SET. If the input shaft speed is equal to or greater than $N_{T2}$, then the position of the clutch, $P_{T2}$, is stored at block 50, otherwise the clutch is moved toward the engaged position until the speed $N_{T2}$ is detected. At block 52, the distance span between $P_{T2}$ and $P_{T1}$ is calculated and the speed ratio $N_{T1}/N_{T2}$ is retrieved at block 54. The offset from clutch position $P_{T1}$ to the clutch touch position is calculated at block 56 and subtracted from $P_{T1}$ in block 58. As shown in block 56, the offset is the square root of the speed ratio multiplied by the distance span.

While the best mode for carrying out the invention has been described in detail, those familiar with the art to which this invention relates will recognize various alternative designs and embodiments for practicing the invention as defined by the following claims.

What is claimed is:

1. Apparatus for determining a touch point position of a clutch coupling a vehicle engine with a transmission input shaft, said apparatus comprising
   means for moving said clutch from a disengaged position toward an engaged position,
   first sensor means for sensing a speed of said input shaft,
   second sensor means for sensing the position of said clutch,
   computer means responsive to inputs from said first and second sensor means, and providing an output to control the positioning of said clutch, said computer means being programmed to move said clutch at a substantially constant rate toward said engaged position while detecting first and second positions of said clutch when the speed of said input shaft is respectively at first and second predetermined speeds, said computer means being programmed to calculate said touch point position equal to said first position minus an offset position equal to the distance between said first and second position times the square root of the ratio of said first and second speeds.

2. The system of claim 1 wherein said first predetermined speed is a fixed amount above a dropout speed of said first sensor means.

3. The system of claim 2 further comprising third sensor means for sensing engine speed of said engine and wherein said second predetermined speed is less than 100% of the engine speed.

4. A method of determining a touch point position of a clutch coupling a vehicle engine with a transmission input shaft, comprising the steps of:
   moving said clutch from a disengaged position toward an engaged position at a substantially constant rate,
   detecting a first position of said clutch when the speed of said input shaft is at a first predetermined speed,
   detecting a second position of said clutch when the speed of said input shaft is at a second predetermined speed greater than said first predetermined speed,
   calculating the touch point position by subtracting from said first position an offset position equal to the distance between said first and second positions times the square root of the ratio of said first and second speeds.

5. The method of claim 4 wherein the speed of said input shaft is sensed by a sensor having a known dropout speed and said first predetermined speed is a fixed amount above said dropout speed.

6. The method of claim 5 wherein said second predetermined speed is less than 100% of the engine speed.

7. A method of determining a touch point position of a clutch coupling a vehicle engine with a transmission input shaft, comprising the steps of:

moving said clutch from a disengaged position toward an engaged position at a substantially constant rate, detecting and storing a first position of said clutch when the speed of said input shaft is at a first predetermined speed, detecting and storing a second position of said clutch when the speed of said input shaft is at a second predetermined speed greater than said first predetermined speed, calculating a span distance equal to the difference between said first and second position, calculating an offset distance equal to the product of said span distance and the square root of the ratio of said first and second speeds, calculating the touch point position by subtracting said offset distance from said first position.

* * * * *